March 21, 1967  I. L. LANGLEY  3,309,814

PLANT HOLDER

Filed Sept. 9, 1965

INVENTOR
IRENE L. LANGLEY
BY, Robert C. Churchill
ATTORNEY

3,309,814
PLANT HOLDER
Irene L. Langley, 122 43rd Ave. NE.,
St. Petersburg, Fla. 33703
Filed Sept. 9, 1965, Ser. No. 486,012
9 Claims. (Cl. 47—41.1)

This invention relates to a plant holder for cemeteries.

The invention has for an object to provide a novel and improved plant holder of the type which is embedded in the ground and arranged to support a flower pot therein, the present plant holder being characterized by the provision of a water receptacle by which the plant may be kept fresh over a long period of time.

The invention has for a further object to provide a novel and improved plant holder of the character specified which is adapted to be inverted when not in use to present its closed end substantially flush with the ground out of the path of a lawn mower.

With these general objects in view and such others as may hereinafter appear, the invention consists in the plant holder as hereinafter described and particularly defined in the claims at the end of this specification.

In the drawings illustrating the preferred embodiment of the invention:

In general, the present invention contemplates a plant holder for use in cemeteries or other places where plants are displayed wherein the flower pot containing the plant may be supported in a plant receptacle below the ground level so as to protect it from being tipped over by the wind or by other causes. The present holder is characterized by the provision of a water receptacle set into the ground below the plane of the plant receptacle supporting the flower pot and by which the roots of the plant which extend through the usual drainage opening in the flower pot may enter to keep the plant fresh. Additionally, a wick may be provided to extend from the flower pot drainage opening into the water receptacle.

In order to comply with cemetery regulations which prohibit any obstructions to the use of a lawn mower, novel provision is made for inverting the present plant holder to provide a closed end structure flush with the ground level when the plant holder is not in use.

Figure 1:
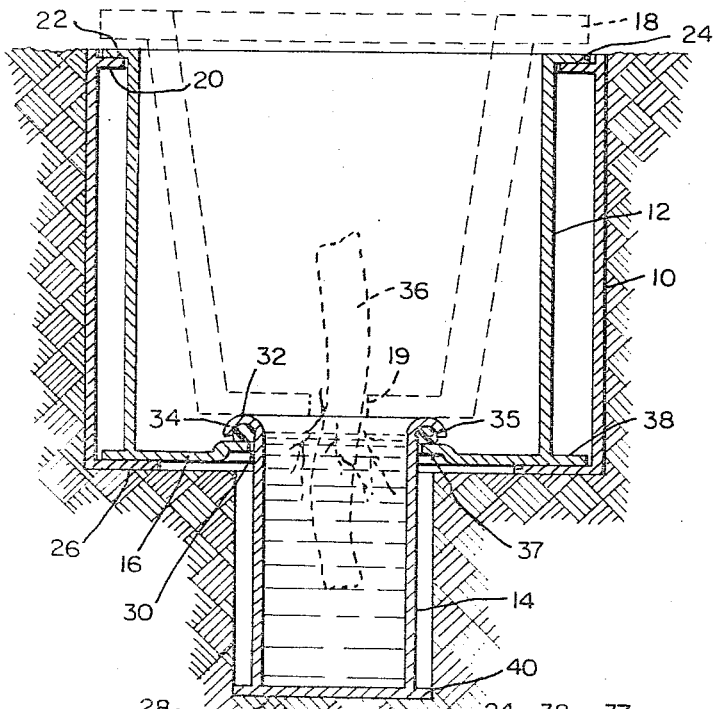
FIG. 1 is a vertical cross sectional view of a plant holder embodying the present invention and showing a flower pot supported therein.

Referring now to the drawings and particularly to FIG. 1, the present plant holder comprises in general an outer cylindrical casing 10 open at both ends and embedded in the ground with its upper end substantially flush with the ground; an inner receptacle 12 mounted within the casing 10; and a water receptacle 14 telescopically mounted in the inner receptacle and insertable into the ground below the plane of the inner receptacle 12. The inner receptacle 12 is open at its upper end and is provided with a bottom wall 16 at its other end in which the water receptacle 14 is mounted. The inner receptacle 12 is arranged to receive a standard flower pot 18 containing the plant to be displayed.

As herein illustrated, the outer casing 10 is provided with an inwardly directed flange 20 at its upper end against which radially extended tongues 22 formed at the upper end of the inner receptacle 12 may rest. The flange 20 is disposed a short distance below the top of the outer casing 10 to provide an annular recess 24 in which the tongues 22 are received to provide an upper surface flush with the ground. The lower end of the outer casing 10 is also provided with an inwardly directed flange 26 against which the bottom wall 16 of the inner receptacle 12 may rest.

The water receptacle 14 is open at its upper end and closed at its lower end to provide an end wall 28. The water receptacle is telescopically fitted into an opening 30 in the bottom wall 16, and the upper end of the water receptacle is provided with an outwardly rolled flange 32 into which a sealing ring 34 of rubber or like material is fitted to bear against the marginal edges of the opening 30 as shown. The marginal edges of the opening 30 are upwardly offset, as shown, to provide a raised circular portion 35 against which the sealing ring 34 may bear and to provide an annular recessed portion 37 on the underside. In operation, the water receptacle 14 is filled with water, and the flower pot is inserted within the receptacle 12 to rest on the rolled flange 32.

In practice, the roots of the plant which extend through the usual drainage opening 19 in the flower pot 18 may be received in the water receptacle to keep the plant supplied with water. A wick 36 may also be provided which extends from the flower pot into the water receptacle to draw up water by capillary action. When it is desired to display cut flowers in the holder instead of the flower pot, the stems of the flowers may be inserted into the water receptacle 14. Water may also be supplied to the receptacle 12.

The expedient of providing a seal 34 between the water receptacle and the marginal edges of the opening 30 in the bottom wall 16 of the receptacle 12 prevents leakage of water from the receptacle 12 through the clearance space between the outside diameter of the water receptacle and the marginal edge of the opening 30. This expedient is of particular advantage when it is desired to display different lengths of cut flowers in the holder so that short stemmed flowers may be supported in the receptacle 12, and the longer stemmed flowers may be supported in the water receptacle 14.

Figure 2:
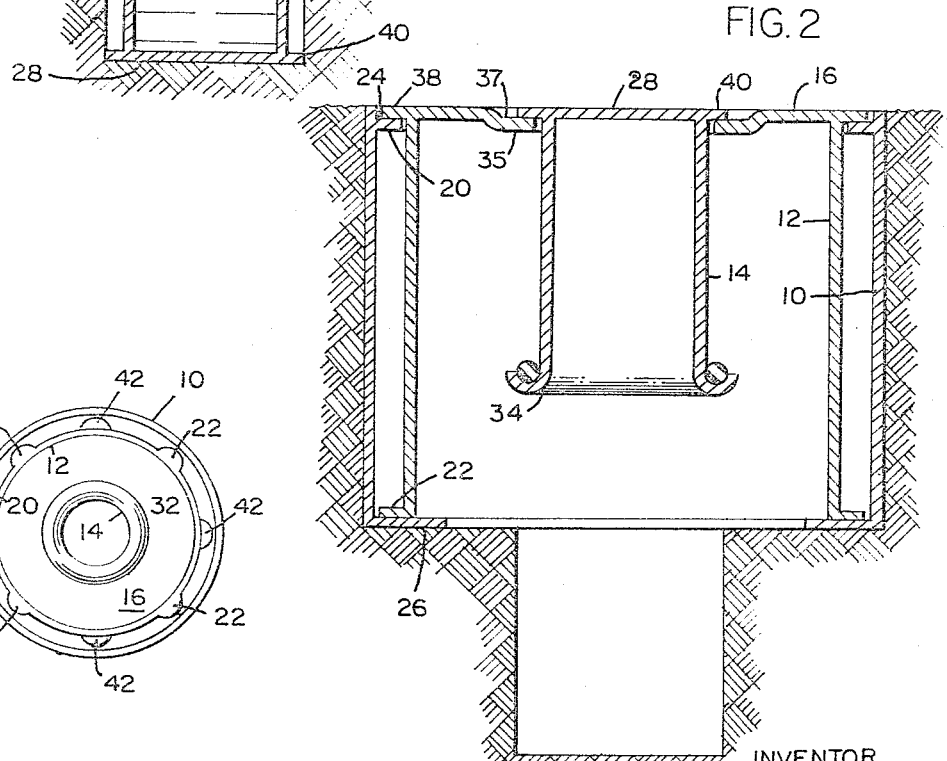
FIG. 2 is a view similar to FIG. 1 showing the plant holder in an inverted position when not in use.
Figure 3:
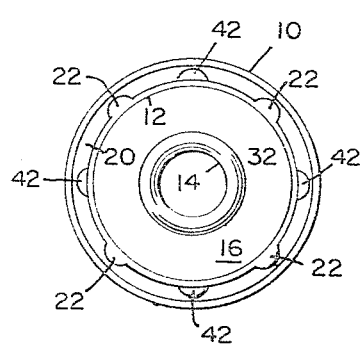
FIG. 3 is a plan view of the plant holder shown in FIG. 1.

Referring now to FIGS. 2 and 3, provision is made for inverting the receptacle 12 and its water receptacle 14 in a manner such as to support the parts with their closed ends flush with the ground. As herein shown, the bottom wall 16 of the receptacle 12 is also provided with laterally extended tongues 38, and the bottom wall 28 of the water receptacle 14 is provided with a laterally extended rim 40. In order to permit removal of the receptacle 12 from the outer casing 10, the inwardly directed flange 20 of the casing is provided with clearance slots 42 through which the tongues 38 may pass when the receptacle 12 is raised up and rotated to present the tongues in alignment with the slots. The removed receptacle 12 with its water receptacle 14 is then inverted and reinserted into the casing 10 by aligning the tongues 22 with the slots 42 to allow the tongues 22 to pass through. When the receptacle 12 is inserted, it may be rotated to move the tongues 38 out of alignment with the slots 42 so that the tongues 38 will rest on the flange 20 in the annular recess 24 to present the wall 16 flush with the upper end of the casing 10, the tongues 22 resting on the lower flanges 26 of the casing. The water receptacle 14 is telescoped into the receptacle 12 to present its laterally extended rim 40 into engagement with the recessed portion 37 of the wall 16 to present the closed end 28 of the water receptacle flush with the wall 16 as shown in FIG. 2.

From the above description it will be seen that the present invention provides a novel plant holder arranged to support a flower pot below the level of the ground and which is characterized by the provision of a water receptacle adapted to keep the plant fresh over a long period of time. In practice, the holder is preferably made of a non-corroding metal. It will also be seen that the present plant holder when inverted provides a structure flush with the ground. The holder may also be incorporated in a plaque set in the ground to provide a flush upper surface with the plaque when the holder is inverted.

While the preferred embodiment of the invention has been herein illustrated and described, it will be understood that the invention may be embodied in other forms within the scope of the following claims.

Having thus described the invention, what is claimed is:

1. A plant holder for cemeteries comprising a cylindrical casing open at both ends adapted to be embedded in the ground with its upper end substantially flush with the ground, a plant receptacle having an open top and a bottom wall supported within the casing, and a water receptacle having an open top and a closed bottom mounted for movement longitudinally in said bottom wall and extended into the ground below the plane of said bottom wall, said plant receptacle adapted for inversion in said casing to present the water receptacle within the plant receptacle, and means for limiting movement of the water receptacle into and out of said plant receptacle.

2. A plant holder as defined in claim 1 wherein the upper end of the outer casing is provided with an inwardly directed recessed flange and the plant receptacle is provided with radially extended tongues for cooperation with said recessed flange to provide a flush upper surface.

3. A plant holder as defined in claim 2 wherein the lower end of said outer casing is provided with an inwardly directed flange for cooperation with the bottom wall of said plant receptacle.

4. A plant holder for cemeteries comprising a cylindrical casing open at both ends adapted to be embedded in the ground with its upper end substantially flush with the ground, an invertible plant receptacle having an open top and a bottom wall supported within the casing, and a water receptacle having an open top and a closed bottom telescopically mounted in an opening in said bottom wall and extended into the ground below the plane of said bottom wall, said water receptacle being movable to a position within the plant receptacle when the latter is inverted, and means on said water receptacle for limiting its movement into and out of said plant receptacle.

5. A plant holder for cemeteries as defined in claim 4 wherein said bottom wall and the closed end of the water receptacle provide a closed structure substantially flush with the ground when inverted.

6. A plant holder as defined in claim 4 wherein the upper end of the outer casing is provided with an inwardly directed recessed flange, and the plant receptacle is provided with outwardly extended tongues at both ends, the tongues at one end cooperating with said recessed flange when the plant receptacle is in an upright position, and the tongues at the other end cooperating with the recessed flange when the plant receptacle is inverted, said recessed flange having slotted portions providing clearance for said tongues to permit ingress and egress of the plant receptacle.

7. A plant holder as defined in claim 6 wherein the marginal edge of the opening in the bottom wall of said plant receptacle is offset upwardly providing an annular recess on the underside and wherein the closed end of the water receptacle is provided with a laterally extended rim for cooperation with said recessed portion to present the closed end of said water receptacle flush with the bottom wall of the plant receptacle when inverted.

8. A plant holder for cemeteries as defined in claim 4 which includes a wick in said water receptacle adapted to be extended into a flower pot supported in said plant receptacle.

9. A plant holder for cemeteries as defined in claim 4 which includes sealing means carried by said water receptacle for engagement with the bottom wall of said receptacle.

References Cited by the Examiner
UNITED STATES PATENTS

| 1,264,096 | 4/1918 | Lelievre | 47—38.1 |
| 1,784,621 | 12/1930 | Boyer | 47—41.1 |
| 1,907,775 | 5/1933 | Flook | 47—41.1 |
| 2,228,575 | 1/1941 | Luipersbek | 47—34.1 |
| 2,276,749 | 3/1942 | Vanderveer | 47—41.1 |
| 2,810,990 | 10/1957 | Wright | 47—41.1 |
| 3,044,214 | 7/1962 | Gill | 47—41.1 |

ABRAHAM G. STONE, *Primary Examiner.*

R. CARTER, *Assistant Examiner.*